United States Patent [19]

Erichsen et al.

[11] 4,368,575

[45] Jan. 18, 1983

[54] PRESSURE TRANSDUCER—METHOD OF MAKING SAME

[75] Inventors: Herman W. Erichsen, Medfield; Michael A. Amoroso, Jr., Billerica, both of Mass.

[73] Assignee: Data Instruments, Inc., Lexington, Mass.

[21] Appl. No.: 168,095

[22] Filed: Jul. 14, 1980

[51] Int. Cl.³ .................. H01C 17/00; G01L 1/22
[52] U.S. Cl. ............................ 29/610 SG; 73/727; 338/4
[58] Field of Search .................. 29/610 SG; 338/2, 3, 338/4, 5, 42, 36; 73/720, 721, 726, 727; 357/26

[56] References Cited

U.S. PATENT DOCUMENTS

| | | | |
|---|---|---|---|
| 3,168,718 | 2/1965 | Swartz et al. | 338/4 X |
| 3,204,463 | 9/1965 | Taber | 73/726 |
| 3,389,362 | 6/1968 | McLellan | 338/4 |
| 4,141,253 | 2/1979 | Whitehead | 338/42 |
| 4,287,772 | 9/1981 | Mounteer et al. | 338/4 |
| 4,295,115 | 10/1981 | Takahashi et al. | 338/4 |

*Primary Examiner*—Leon Gilden
*Attorney, Agent, or Firm*—Schiller & Pandiscio

[57] ABSTRACT

An improved pressure transducer is formed from selectively formed elements including those made from sheet materials of predetermined thicknesses and those made from brazing materials so as to form brazing preforms. The elements are easily assembled and heated so as to braze the elements together to form the transducer.

12 Claims, 7 Drawing Figures

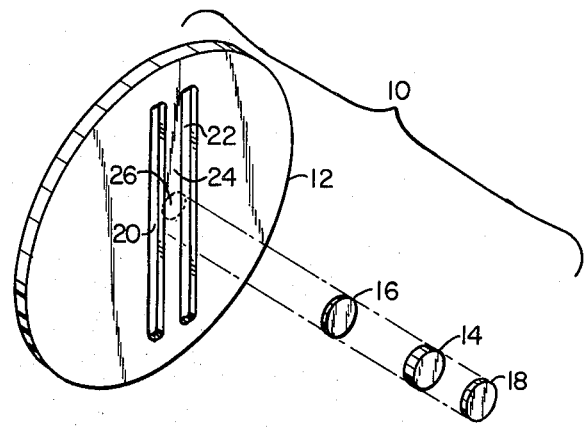
Fig. 1
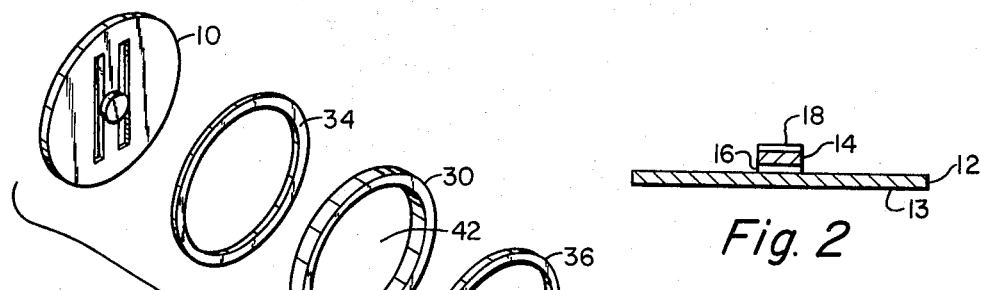
Fig. 2
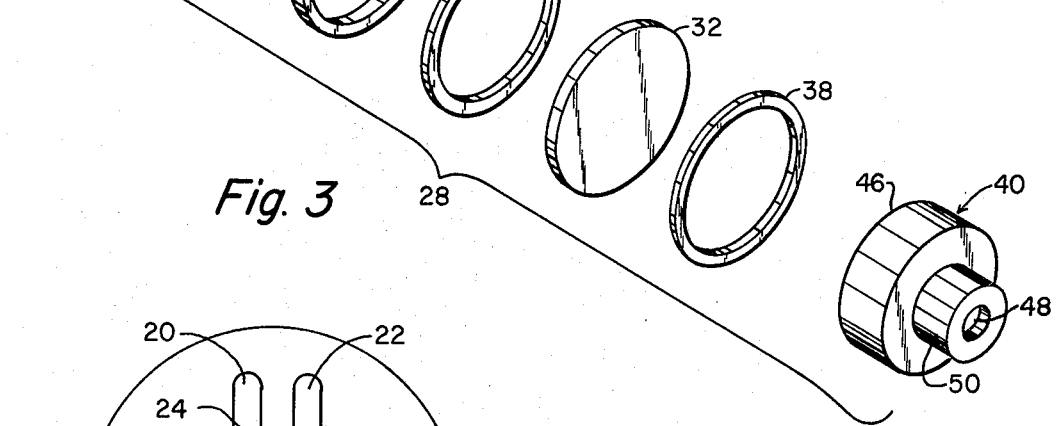
Fig. 3
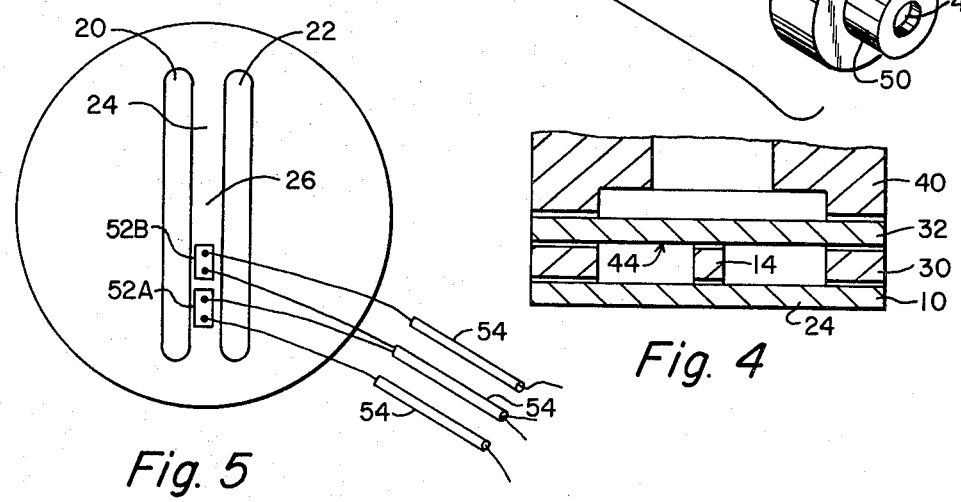
Fig. 4
Fig. 5

PRESSURE TRANSDUCER—METHOD OF MAKING SAME

The present invention relates to pressure transducers and to processes of making pressure transducers, and more particularly to an improved process of making semiconductor strain gage pressure transducers and the product produced thereby.

Two available, basic types of semiconductor strain gage pressure transducers are (1) the beam type strain gage pressure transducer, such as the one described in U.S. Pat. No. 3,611,767 issued to J.P.A. Pugnaire on Oct. 12, 1971, and (2) the diffused diaphragm type strain gage pressure transducer, such as any one of those described in *Transducers, Pressure and Temperature,* 1974, a catalogue and handbook of integrated circuit pressure and temperature transducers published by National Semiconductor Corporation of Santa Clara, Calif.

An improved transducer which substantially retains the advantages of these two basic types of transducers, while reducing or substantially eliminating the disadvantages of each is described in U.S. patent application Ser. No. 058,282 filed by Herman W. Erichsen on July 17, 1979 now U.S. Pat. No. 4,327,350, which application has been assigned to the present assignee and shall hereinafter be referred to as the "Copending Application". The improved pressure transducer is constructed from sheet materials of predetermined thicknesses. One of the sheets is formed with at least one and preferably two apertures so as to define a deflection beam. The beam is adapted to carry at least two gage sensors. Another sheet defines a planar, flexible diaphragm portion overlying the beam and fixed (1) so as to be incapable of movement in its plane relative to the beam, and (2) so that (a) the beam will deflect responsively when the diaphragm is deflected in at least one direction, and (b) the sensors will respond so as to indicate the amount of deflection of the diaphragm. By using sheet materials to construct the transducer, a multitude of transducers can be formed and assembled simultaneously from wafers or master sheets and subsequently diced or cut into individual transducer assemblies preferably using standard semiconductor techniques or alternatively other techniques known in the art.

It is an object of the present invention to provide an improved process of making pressure transducers which incorporates the concept of forming the beam and diaphragm of each transducer from sheet materials as suggested in the Copending Application.

It is another object of the present invention to provide an improved, reliable and fast method of assembling a pressure transducer.

Another object of the present invention is to provide a method of making a pressure transducer from relatively inexpensive parts which results in an improved transducer exhibiting good performance results.

These and other objects of the present invention are achieved by an improved pressure transducer formed from selectively formed elements including those made from sheet materials of predetermined thicknesses and those made from brazing materials so as to form brazing preforms. The elements are easily assembled and heated so as to braze the elements together to form the transducer.

Other features and many attendant advantages of the invention are disclosed in or rendered obvious by the following detailed description which is to be considered together with the accompanying drawings in which:

FIG. 1 is an exploded perspective view of a subassembly of elements which are secured together in accordance with the preferred method of the present invention;

FIG. 2 is a cross-sectional view of the subassembly of elements of FIG. 1 assembled prior to heating the braze preforms of the subassembly;

FIG. 3 is an exploded perspective view of a group of elements, including the subassembly of FIG. 1, which are to be secured together in accordance with the preferred method of the present invention;

FIG. 4 is a cross-sectional view, partially cut away, of the elements of FIG. 3 assembled together prior to heating of the braze preforms;

FIG. 5 is a frontal view of the beam-defining element of the group of elements shown in FIG. 3, further showing two sensors and associated connecting wires secured in place on the beam in accordance with the preferred method of the present invention;

The same numerals are utilized throughout the drawings to designate similar or like parts.

Figure 6:
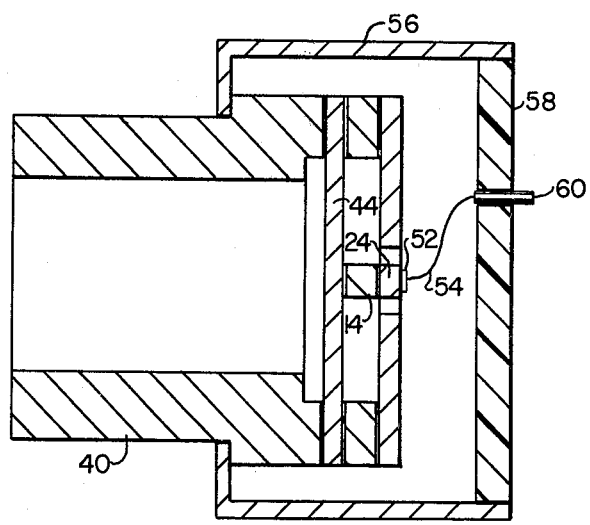
FIG. 6 is a longitudinal cross-sectional view of the preferred embodiment of transducer component parts made in accordance with and incorporating the principles of the present invention.

The preferred method of making the pressure transducer of the present invention includes a separate step of making the subassembly 10, shown in FIG. 1. The preferred subassembly 10 is formed by preforming a beam-defining element 12, post 14 and braze preforms 16 and 18. More particularly, the beam defining element 12 is preferably a stainless steel disc cut from a sheet of a predetermined thickness and etched or machine stamped to provide a pair of elongated parallel apertures 20 and 22. Apertures 20 and 22 define a deflection beam 24 therebetween. The elongated center axis of the beam extends along the diameter of the disc element 12 with the center 26 of the beam lying in the approximate center of the disc element 12. The beam will deflect responsively to forces applied to the center 26 normal to the disc 12 as a function inter alia, of the thickness of the beam. The post 14 is also preferably made of stainless steel having a predetermined cross-sectional dimension approximately the same as the width of the deflection beam 24. The two braze preforms 16 and 18, preferably made of a silver-braze alloy, are precut so as to have approximately the same shape and diameter as the post 14.

In the preferred method of the present invention the subassembly 10 is first assembled as shown in FIG. 2. Specifically, beam defining element 12 is placed with one side 13 face down on a suitable support (not shown). The preform 16 is then placed on the opposite side of element 12 approximately at the beam center 26. The post 14 is then placed directly on top of the preform 16. Once the post 14 is set in place the second preform 18 is placed on top of post 14.

The subassembly 10 is then heated to a high enough temperature to melt brazing preforms 16 and 18, and then the subassembly is cooled so that preform 16 brazes the post 14 to the deflection beam 24, and preform 18 is brazed to the top of post 14. Preferably, the element 12, post 14, and preforms 16 and 18 are secured together by using a resistance spot welding machine, although other heating techniques are well known in the art. With such a machine coalescence of the element 12, post 14 and preforms 16 and 18 is produced by the flow of a low-voltage, high-current signal through the element 12, post 14 and preforms 16 and 18 while the parts are held under pressure.

FIG. 3 illustrates another step of the preferred method subsequent to the assembly of subassembly 10. Specifically, FIG. 3 shows an assembly 28 comprising the elements of the preferred transducer embodiment. Assembly 28 includes the subassembly 10 and elements preformed from sheet materials, brazing preforms and a port element. In particular, assembly 28 includes subassembly 10 secured together as previously described, a spacer element 30, a diaphragm element 32, three brazing preform elements 34, 36, and 38 and a port element 40.

The spacer element 30 is preferably formed in a ring-shaped manner so as to define a center aperture 42 which coacts with element 32 to define a flexible diaphragm 44 (shown in FIGS. 4 and 6). The spacer and diaphragm elements 30 and 32 are preferably stamped out of stainless steel sheet materials of predetermined thicknesses. Preferably, the thickness of the spacer element is approximately the same as the corresponding dimension of post 14, while the thickness of diaphragm 32 is selected according to the pressures to which the diaphragm 44 will be exposed during use of the pressure transducer and specifically the flexibility of the diaphragm 44 in response to that pressure.

The brazing preforms 34, 36 and 38 are preferably ring-shaped and are made of the same material as the material used for preforms 16 and 18. The port element 40 is preferably made of stainless steel and preformed as a hollow cylindrical structure so that it can be connected at one end 46 to the other elements of assembly 28. A fluid medium whose pressure is to be measured is introduced through opening 48 at the other end 50 of the port element 40 so that the medium will contact the diaphragm 44. The outer cross-sectional dimensions of subassembly 10, spacer element 30, diaphragm element 32, the end 46 of port element 40, as well as braze preforms 34, 36 and 38 are all substantially equal so as to provide the appearance of a unitary structure of the assembly in its final form shown in FIG. 6. The apertures of the preforms 34, 36 and 38 are all shaped substantially the same and similar to aperture 42 of the ring-shaped structure of spacer element 30, so that braze preform 34 will fit between subassembly 10 and spacer element 30, braze preform 36 will fit between spacer element 30 and diaphragm 32 and braze preform 38 will fit between diaphragm element 32 and the end 46 of the port element 40.

The elements are assembled in accordance with the preferred method of the present invention as best illustrated in FIG. 4. The subassembly 10 previously made as described with respect to FIGS. 1 and 2, is placed so that the exposed face 13 of the beam defining element 12 faces down and the post 14 extends above the element 12. Next the preform 34 is concentrically placed on the subassembly 10, and in particular on the beam defining element 12 of the subassembly 10. The spacer element 30 is then disposed concentrically over the preform 34 so that post 14 extends through aperture 42. Next the preform 36 is concentrically disposed on the spacer element 30. The preform material on post 14 resulting from the forming of subassembly 10 will extend in the aperture of preform 36. The diaphragm element 32 is then placed concentrically over the preform 36 and the braze material on post 14. The preform 38 can then be concentrically disposed on the diaphragm element 32 and the end 46 of the port element 40 positioned on top of the preform 38. The assembly is then conveyed to a furnace (not shown) by, for example, a conveyor belt (also not shown) so that it can be heated. In this regard the weight of port element 40 will hold the parts together so that no other weight or mechanical structure such as a jig is required to hold the parts together. This gives the method of the present invention a distinct advantage since it makes the assembling and conveying steps easy and inexpensive.

Once the assembly 28 reaches the furnace it is heated to a temperature sufficient to melt the brazing preforms 34, 36 and 38, and then the assembly is cooled so as to braze subassembly 10 to spacer element 30, spacer element 30 to diaphragm element 32 and diaphragm element 32 to the end 46 of port 40. Further, since brazing material from preform 18 will be provided on the top of post 14, the post will be brazed to the approximate center of the diaphragm 44. The exact temperature at which the assembly is heated is largely dependent upon the particular brazing material employed to make the preforms 16, 18, 34, 36 and 38. Silver braze materials (preferred for this invention) typically have melting temperatures in the range from 1300° C. to 1600° C. The brazing temperatures (i.e. the temperatures required to melt the braze material sufficiently to provide brazing) can typically vary from temperatures at the melting point to as much as 50° C. above the melting point.

After assembly 28 has been heated to braze the elements together, at least two sensors as shown in FIG. 5, preferably in the form of small doped semiconductor bars 52A and 52B made of germanium or silicon, are bonded to the side of deflection beam 24 opposite that of post 14, so that one of the bars is subjected to compression and the other to tension when the diaphragm flexes and causes post 14 to move, resulting in deflection of the beam 24. As shown, the sensing bars are placed on one side of the center 26 of the beam with one bar 52B closer to the center 26 of the beam 24 than the other so that the condition of one bar being in compression and the other in tension is met as described in the Co-pending Application. The sensors 52A and 52B are suitably connected by leads 54.

Referring to FIG. 6, the entire resulting assembly is secured in a suitable manner to a suitable casing 56 by securing one end of the casing to the port element 40 and capping off the other end of the casing 56 with terminal header 58. The leads 54 are connected to corresponding terminal pins 60 (one being shown in FIG. 6).

Figure 7:
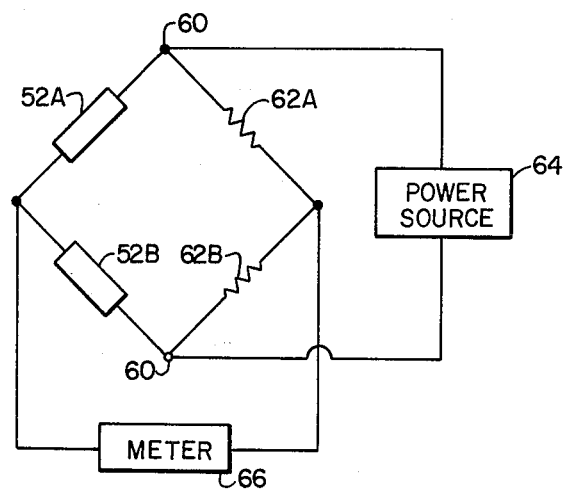
FIG. 7 is a schematic diagram illustrating the electrical circuitry of the transducer of the present invention.

As shown schematically in FIG. 7, the terminal pins 60 in turn can be connected to external completion resistors 62A and 62B so as to form a Wheatstone bridge circuit, with sensors 52A and 52B forming two arms of the bridge. As well known, a suitable power source 64 is connected to the bridge at opposite nodes so as to impress an equal input signal across the combined two arms of the bridge formed by sensors 52A and 52B on the one hand, and the remaining two arms of the bridge formed by resistors 62A and 62B on the other hand. As well known, a meter 66 is connected across the remaining nodes so that a change in resistances of sensors 52A and 52B in response to a deflection of beam 24 provides a change in meter reading. It should be appreciated that two additional gage sensors equivalent respectively to sensors 52A and 52B can be carried by the beam 24, so that of the resulting four sensors carried by this beam, two will be under compression and the other two under tension when the beam deflects. In such a situation the four sensors are suitably connected to form a fully active bridge configuration. As well known in the art, in both types of configurations the bridge is balanced in accordance with techniques well known in the art.

The pressure transducer made according to the principles of the present invention is thus easy to assemble and manufacture while utilizing concepts as well as some of the advantages described in the Copending Application. The resulting pressure transducer made in accordance with the present invention provides relatively high performance at a relatively inexpensive cost.

Certain changes may be made in the above process and product without departing from the principles of the present invention herein involved. For example, although the beam defining element 12, post 14, spacer element 30, diaphragm element 32 and port element 40 have been described as made of stainless steel and the braze preforms 16, 18, 34, 36 and 38 have been described as made of silver braze, other materials can be utilized without departing from the principles of the present invention.

Since certain other changes may be made in the above process and product without departing from the principles of the present invention herein involved it is intended that all matter contained in the above description or shown in the accompanying drawings shall be interpreted in an illustrative and not in a limiting sense.

What is claimed is:

1. A process of making a pressure transducer, the process comprising the steps of:
   selectively forming the following elements
   (a) a first sheet of material including at least two apertures so as to form a beam therebetween,
   (b) a second sheet of material including an aperture,
   (c) a third sheet of material adapted to cooperate with the aperture of the second sheet so as to define a flexible diaphragm,
   (d) a post adapted to be disposed between the beam and the diaphragm, and
   (e) at least four braze preforms, sized so that a first preform is adapted to be disposed between the beam and the post, a second preform is adapted to be disposed between the post and the diaphragm, a third preform is adapted to be disposed between the first and second sheets, and the fourth preform is adapted to be disposed between the second and third sheets; and
   assembling and heating said elements so as to braze said post to said beam with said first preform, said post to said diaphragm with said second preform, said second sheet to said first sheet with said third preform so that said post extends through the aperture of the second sheet, and the third sheet to the second sheet with said fourth preform so that the aperture of the second sheet cooperates with the third sheet to define said diaphragm.

2. A process according to claim 1, wherein said step of assembling and heating includes the steps of assembling said first sheet of material, said first braze preform, said post and said second braze preform so as to provide a subassembly and heating said subassembly so as to braze one end of said post to said beam of said first sheet with said first braze preform and to provide brazing material on the other end of said post.

3. A process according to claim 2, wherein said step of heating said subassembly includes the step of spot welding said one end of said post to said beam with said first braze preform and said second braze preform to said other side of said post.

4. A process according to claim 3, wherein said step of assembling and heating includes the step of assembling said subassembly, said second and third sheets and said third and fourth braze preforms and heating the subassembly, second and third sheets and said third and fourth braze preforms so as to braze said elements together.

5. A process according to claim 4, wherein said step of selectively forming said elements further includes the step of preforming a port element and a fifth braze preform, and said step of assembling and heating includes the steps of assembling said subassembly, said second, third sheets, said port element, and said third, fourth and fifth braze preforms so as to form an assembly, and heating said assembly so as to braze the opposite end of said post to said diaphragm with said second braze preform, said second sheet to said first sheet with said third preform, said third sheet to said second sheet with said fourth preform and said port element to said third sheet with said fifth braze preform.

6. A process according to claim 5, wherein said step of forming said elements includes the steps of forming apertures in each of said third, fourth and fifth preforms.

7. A process according to claim 6, wherein said step of assembling said assembly includes the steps of
   placing said subassembly so that said subassembly rests on said first sheet and said post extends above said first sheet;
   disposing said third braze preform on said subassembly so that said post extends through the aperture of said third preform;
   placing said second sheet on said third preform so that said post extends through the aperture of said second sheet;
   disposing said fourth preform on said second sheet so that the brazing material of said second braze preform of said subassembly is disposed in the aperture of said fourth braze preform;
   placing said third sheet on said fourth preform and the brazing material of said second braze preform of said subassembly;
   disposing said fifth braze preform on said third sheet; and
   placing said port element on said fifth braze preform.

8. A process according to claim 7, where the apertures in said third and fourth preforms are sized and shaped substantially the same as and are assembled concentric with the aperture of said second sheet.

9. A process according to claim 7, wherein said step of heating said assembly includes the step of maintaining said assembly in its assembled relationship by the weight of said port element.

10. A process according to claim 9, further including the step of securing at least two beam deflecting sensors to said beam.

11. A process according to claim 10, further including securing said assembly to a protective casing.

12. A product made in accordance with the process as set forth in accordance with any one of the claims 1-11.

* * * * *